Feb. 14, 1967   C. VAN DER LELY   3,304,093
IMPLEMENTS FOR SPREADING MATERIALS
Filed April 20, 1964   4 Sheets-Sheet 1
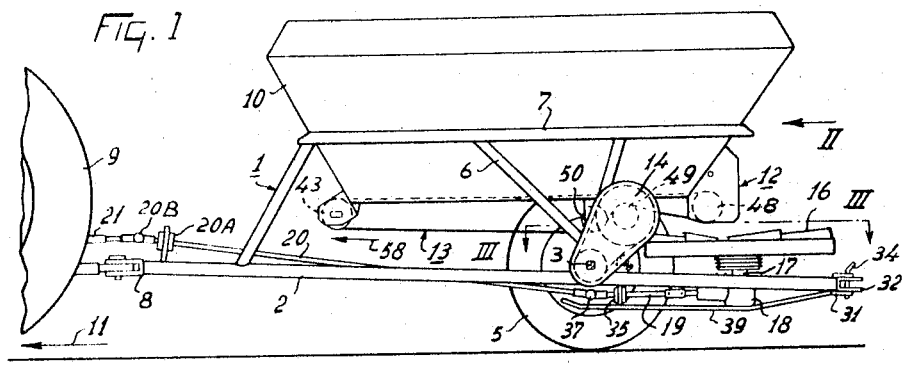
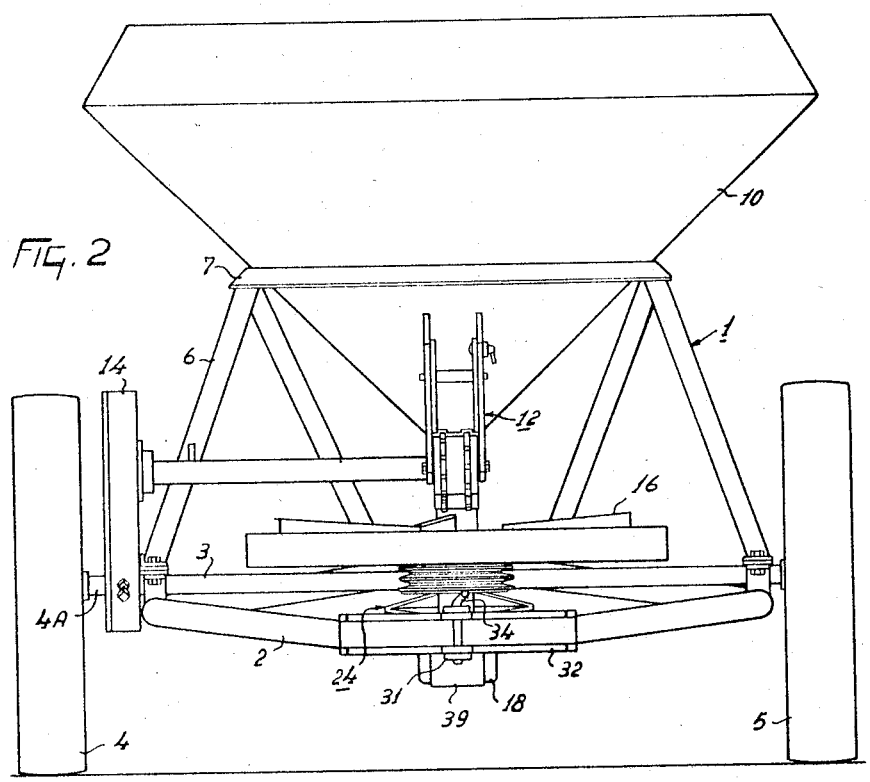
INVENTOR.
CORNELIS VAN DER LELY
BY
Mason, Mason & Albright
Attorneys Feb. 14, 1967   C. VAN DER LELY   3,304,093
IMPLEMENTS FOR SPREADING MATERIALS
Filed April 20, 1964   4 Sheets-Sheet 2

INVENTOR.
CORNELIS VAN DER LELY
BY
Mason, Mason & Albright
Attorneys

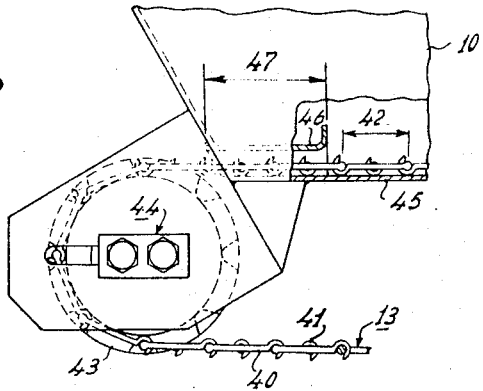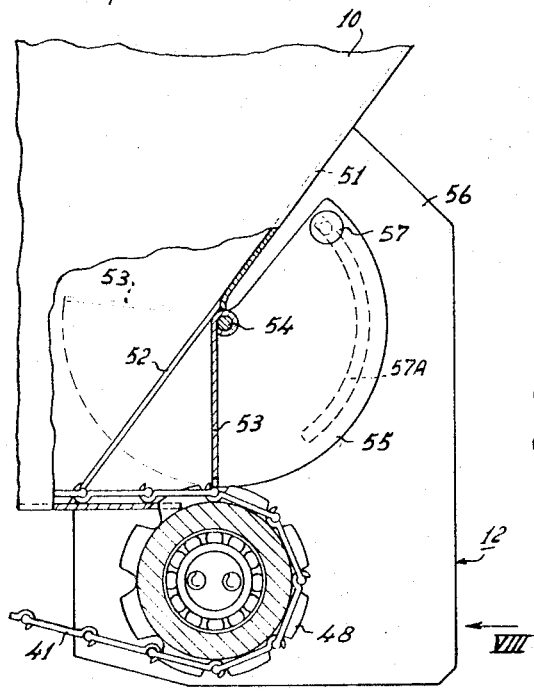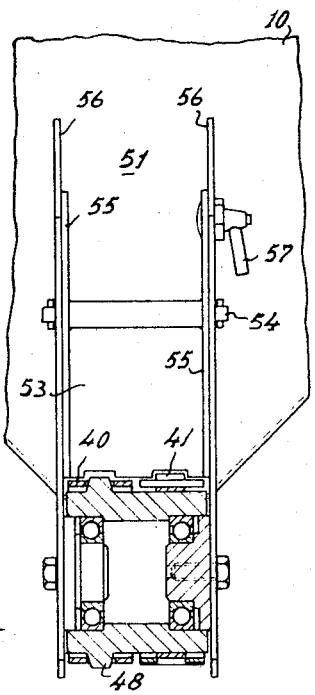

Feb. 14, 1967     C. VAN DER LELY     3,304,093
IMPLEMENTS FOR SPREADING MATERIALS
Filed April 20, 1964     4 Sheets-Sheet 4
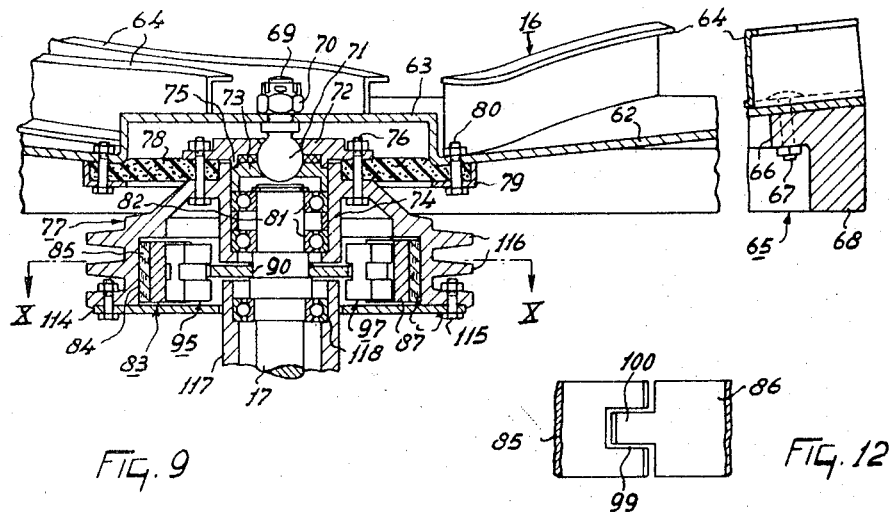
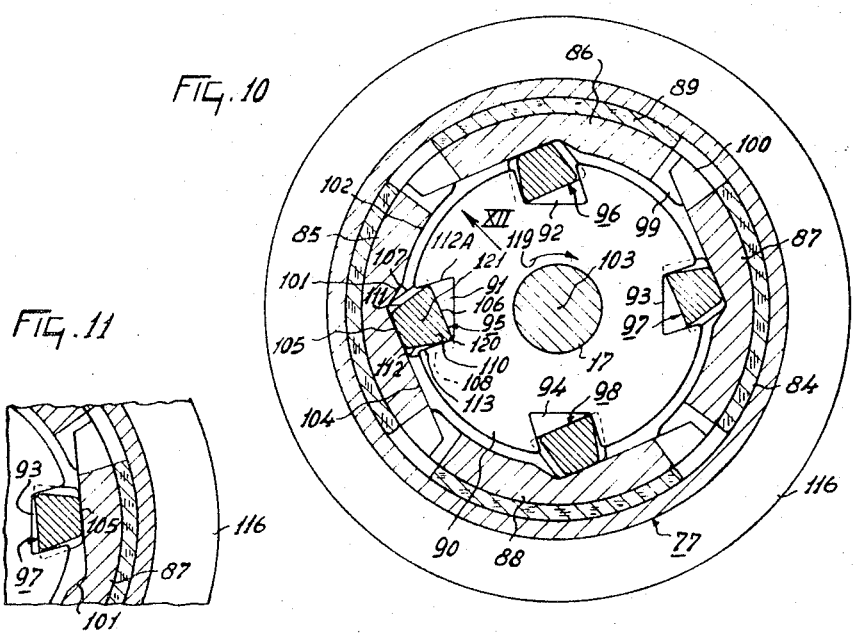
INVENTOR.
CORNELIS VAN DER LELY
BY
Mason, Mason & Albright
Attorneys

United States Patent Office 3,304,093
Patented Feb. 14, 1967

3,304,093
IMPLEMENTS FOR SPREADING MATERIALS
Cornelis van der Lely, Zug, Switzerland, assignor to Patent Concern N.V., Willemstad, Curacao, Netherlands Antilles, a limited-liability company
Filed Apr. 20, 1964, Ser. No. 361,043
Claims priority, application Netherlands, May 7, 1963, 292,455, 292,456
28 Claims. (Cl. 275—8)

This invention relates to implements for spreading materials, such implements being of the kind comprising a frame movable over the ground, a container for material to be spread and a spreading member arranged to receive material from the container in the use of the implement.

An object of the invention is the provision of an implement in which the distribution spectrum of the material, that is to say, the extent and position of the area of ground upon which the material falls relative to the path of travel of the implement, can be adjusted in a simple and effective manner.

According to the invention, there is provided on implement of the kind set forth, wherein the spreading member is mounted on the frame in such a way as to be moveable to, and retainable in, different positions relative to the container, the arrangement being such that, in the use of the implement, material from the container is delivered to a region of the spreading member corresponding to the position of the latter relative to the container.

This invention relates further to implements for spreading materials, such implements being of the kind comprising a frame movable over the ground and a rotary spreading member supported by said frame, whereby according to the invention, there is provided an implement of the kind set forth, wherein the means for transmitting rotary drive to the spreading member includes an overrunning or free-wheel clutch.

According to this construction, it is possible, to improve the efficiency of such implements in regard to the evenness with which they will spread material.

Figure 3:
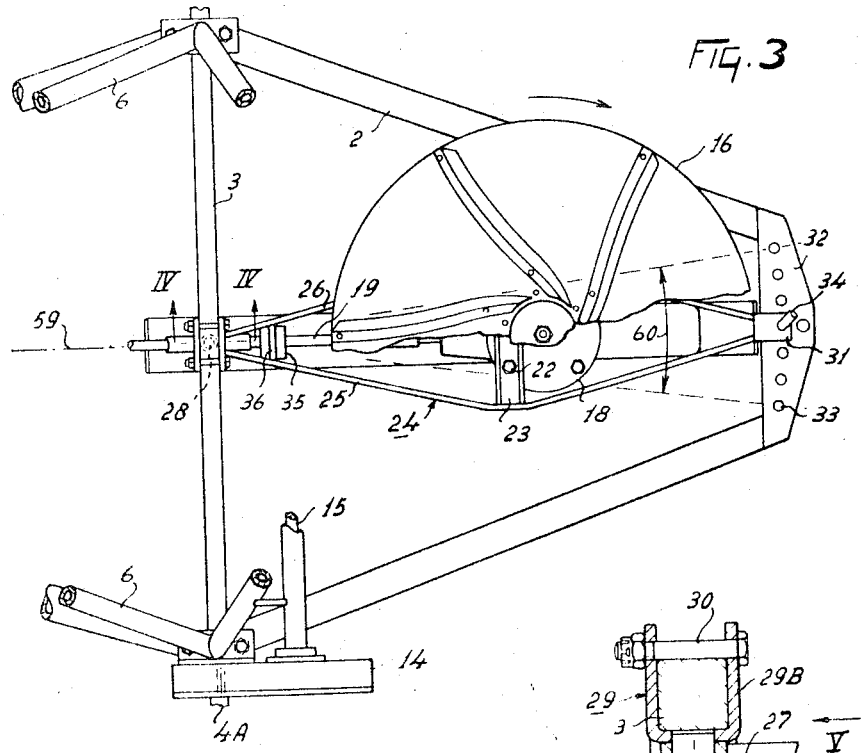
Figure 4:
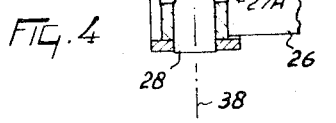
Figure 5:
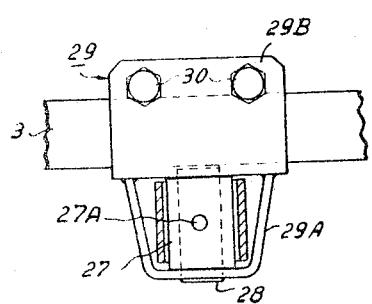

For a better understanding of the invention, and to show how the same may be carried into effect, reference will now be made, by way of example, to the accompanying drawings, in which:

FIGURE 1 is a side elevation of an implement in accordance with the invention coupled to the rear of a tractor, FIGURE 2 is a rear elevation, to an enlarged scale, as seen in the direction indicated by the arrow II of FIGURE 1, FIGURE 3 is a section, to an enlarged scale, taken on the line III—III of FIGURE 1, FIGURE 4 is a section, to an enlarged scale, taken on the line IV—IV of FIGURE 3, FIGURE 5 is a scrap section as seen in the direction indicated by the arrow V of FIGURE 4, FIGURE 6 is a part-sectional side elevation showing certain parts of the implement that can be seen in FIGURE 1 and that are located towards the leading end of the implement to an enlarged scale and in greater detail, FIGURE 7 is a part-sectional side elevation similar to FIGURE 6 but illustrating parts of the implement located towards the rear end thereof, and FIGURE 8 is a scrap rear elevation as seen in the direction indicated by the arrow VIII of FIGURE 7, FIGURE 9 is a sectional elevation, to an enlarged scale, of part of the implement of FIGURES 1 and 2, FIGURE 10 is a section taken on the line X—X of FIGURE 9, FIGURE 11 is a scrap view corresponding to FIGURE 9 but showing certain parts in different relative positions, and FIGURE 12 is a scrap elevation as seen in the direction indicated by the arrow XII of FIGURE 9.

Referring to the drawings, the spreading implement which is illustrated has a frame 1 that includes a horizontal or substantially horizontal framework 2 which is formed from a number of interconnected beams and to which a transverse axle 3 is rigidly secured. Ground wheels 4 and 5 are rotatably mounted at opposite ends of the axle 3, the ground wheel 4 being omitted from FIGURE 1 for the sake of clarity. The frame 1 includes a second horizontal or substantially horizontal framework 7 located at a level above that of the framework 2 and rigidly connected to the latter by a number of upwardly inclined beams 6. The leading end of the lower framework 2 is provided with a forked bracket 8 which is intended to be employed, in the manner illustrated in FIGURE 1, to connect the implement to the tow-bar of a propelling vehicle such as the tractor 9.

The second or upper framework 7 supports a container in the form of a hopper 10, the hopper having an outlet or delivery port 12 at its rearmost end with respect to the intended direction of travel of the implement which is indicated by the arrow 11 in FIGURE 1 of the drawings. The floor of the hopper 10 is provided with a conveyor generally indicated by the reference numeral 13, the said conveyor being arranged to be driven from the ground wheel 4 by means including a sleeve 4A (FIGURES 2 and 3) arranged around the relatively fixed axle 3, a sprocket and chain transmission 14 and an encased shaft 15 (FIGURE 3).

A rotary ejector or spreading member 16 that is generally horizontally disposed is located at the rear of the implement beneath the outlet port 12 of the hopper 10. The ejector 16 is secured to the uppermost end of a substantially vertical shaft 17 whose lowermost end is journalled in a gear casing 18 having a substantially horizontally disposed input shaft 19. The leading end of the shaft 19 is journalled in a substantially horizontal bearing 35 and is coupled by a universal joint 37 to the rearmost end of an intermediate transmission shaft 20. The leading end of the shaft 20 is journalled in a bearing 20A supported by the lower framework 2 and is connected by a second universal joint 20B to a telescopic transmission shaft 21 that is in driven communication with the power take-off shaft of the tractor 9 or other propelling vehicle during use of the implement. The gear casing 18 is fastened to the lower side of a beam 23 (FIGURE 3) by bolts 22, the beam 23 forming part of a supporting structure 24 for the ejector 16.

The supporting structure 24 includes two strips 25 and 26 which are symmetrically shaped with respect to a vertical plane of approximate symmetry of the implement 59 (FIGURE 3) that extends parallel to the direction 11 (FIGURE 1). The leading ends of the two strips 25 and 26 are fastened to a vertical sleeve 27 (FIGURE 4). The sleeve 27 surrounds a vertical shaft 28 and is secured thereto by a transverse pin 27A. The shaft 28 is journalled in the base of a lower forked bracket 29A and in the base of an upper forked bracket 29B, the free ends of the limbs of the lower bracket 29A being rigidly secured to the base of the upper bracket 29B (see FIGURE 5) so as to form jointly a fastening member which is generally indicated by the reference numeral 29. The upper forked bracket 29B is engaged around the axle 3 which, as can be seen in FIGURE 4, is of square cross-section, a pair of bolts 30 entered through registering holes in the limbs of the upper bracket 29B being employed to prevent displacement of the fastening member 29 relative to the axle 3. The rearmost ends of the two strips 25 and 26 are interconnected by a forked bracket 31 that has horizontally extending limbs disposed respectively above and below the limbs of a beam 32 of channel-shaped cross-section (see FIGURES 1, 2 and 3). The limbs of the bracket 31 are formed with vertically aligned holes that can be brought into register with a chosen one of seven pairs of vertically aligned holes 33 formed in the limbs of the beam 32 at equal distances from the longitudinal axis 38 (FIGURE 4) of the shaft 28. A vertical locking pin 34 is provided for entry through the holes in the limbs of the bracket 31 and the chosen pair of holes 33 to retain the supporting structure 24 and the ejector 16 which it carries in a corresponding angular setting about the axis 38.

The aforementioned substantially horizontal bearing 35 in which the leading end of the input shaft 19 is journalled is carried by a strip 36 (FIGURE 3) that interconnects the two strips 25 and 26 towards the leading ends thereof. It should be noted that the longitudinal axis 38 of the shaft 28 intersects, or passes very close to, the mid-point of the universal joint 37 which is mounted at the leading end of the input shaft 19. The lower side of the supporting structure 24 carries a screening plate 39 (FIGURES 1 and 2), the leading end of this plate being fastened to the strip 36 and the rearmost end to the bracket 31. The screening plate 39 extends beneath the input shaft 19 and the gear casing 18.

The conveyor 13 includes two chains 40 and 41 (FIGURE 8) that are arranged along side one another, the chain 40 being longitudinally out of register with the chain 41 by a distance equal to half the length 42 (FIGURE 6) of one link of either chain. The chains 40 and 41 are passed around a double sprocket 43 (FIGURES 1 and 6) mounted at the leading end of the floor 45 of the hopper 10. A double sprocket 43 is mounted on an adjustable tensioning member 44 that can be moved in directions parallel to the direction 11 to increase or decrease the tension in the chains 40 and 41. A mouth 46 is formed immediately above the leading end of the floor 45 of the hopper 10, said mouth having a longitudinal extent 47 (FIGURE 6) which is equal to approximately twice the aforementioned length 42 of one of the links of either of the two chains 40 and 41.

A double sprocket 48 (FIGURES 1, 7 and 8) similar to the double sprocket 43 is rotatably mounted immediately beneath and behind the rearmost end of the floor 45 of the hopper 10. A double sprocket 49 (FIGURE 1) is rigidly mounted on the shaft 15 beneath the hopper 10 and the two chains 40 and 41 pass over this double sprocket and are driven thereby during movement of the implement over the ground. A double jockey sprocket 50 is rotatably mounted close to the double sprocket 49 and acts to ensure that sufficient lengths of the two chains 40 and 41 are always in contact with the teeth of the driving double sprocket 49.

An opening 52 (FIGURE 7) is formed in the rearmost wall 51 of the hopper 10 at the lowermost end of this wall, the said opening 52 forming the actual outlet of the outlet port that is generally indicated by the reference numeral 12. As can be seen in FIGURES 7 and 8, two vertical and parallel cheek plates 56 are fastened to the rearmost wall 51 of the hopper 10 on either side of the opening 52, a horizontal pivot pin 54 extending between the plates. A shutter plate 53 is turnable about the axis of the pivot pin 54 between the position which is shown in full lines in FIGURE 7 in which it completely closes the opening 52 and the position which is shown in broken lines in the same figure in which the opening 52 is open to its maximum extent. Two vertical sector plates 55 that are disposed parallel to one another and perpendicular to the plane of the shutter plate 53 are secured to opposite edges of the shutter plate 53 so as to lie alongside corresponding ones of the two cheek plates 56. One of the sector plates 55 is formed with a single hole that registers with an arcuate slot 57A formed in the corresponding cheek plate 56 and having its centre of curvature coincident with the pivot pin 54. A clamp 57 in the form of a bolt and co-operating wing nut or the like is provided, the shank of the bolt being entered through the hole in the sector plate 55 and through the slot 57A. The shutter plate 53 is manually turnable about the axis of the pivot pin 54 and can be retained in either of the two extreme settings shown in FIGURE 7, or in any chosen intermediate setting, by tightening the clamp 57 at an appropriate point.

The ejector 16 includes a shallow dished disc 62 having a flat raised region 63 at its centre. Six equi-angularly spaced spreading blades 64 are fastened to the uppermost surface of the disc 62 so as to radiate from the raised region 63 thereof. An annular inertia weight in the form of a ring 65 is fastened to the lower side of the disc 62 adjacent its periphery by a number of flat-headed bolts 67. As can be seen in FIGURE 9 of the drawings, the ring 65 is of inverted L-shaped cross-section having an approximately horizontal limb 66 through which the bolts 67 are entered and a thicker vertical limb 68 whose radially outermost side is in register with the radially outermost edge of the disc 62.

A stud 69 projects vertically above the centre of the raised region 63 of the disc 62, the lowermost end of said stud carrying the ball 71, which is located below said region 63, of a ball and socket joint. The ball 71 is fixed in position relative to the region 63 by a castellated nut 70 mounted on the screwthreaded stud 69 and locked in position in known manner with the aid of a split pin. The ball 71 is sandwiched between an upper plate 72 and a lower plate 73 and is partly located in correspondingly shaped holes formed in both these plates. The lower plate 73 is arranged internally of the upper end of a sleeve 74 whilst the upper plate 72 is formed with a downwardly projecting flange 75 which fits just inside the extreme upper end of the sleeve 74 and centres the said plate relative to that sleeve. The upper plate 72 is drawn downwardly into engagement with the lower plate 73 by a number of bolts 76 entered through aligned holes formed in a collar of the plate 72 and a collar of the sleeve 74. A conical extension of the collar of the sleeve 74 that has just been mentioned carries an integral housing 77 for an overrunning or free-wheel clutch 83. A ring 78 of rubber or like resilient material has its radially innermost edge sandwiched between the flange of the upper plate 72 and the flange of the sleeve 74. However, the ring 78 is of approximately the same diameter as the housing 77 and its radially outermost edge is clamped to the disc 62 alongside its central region 63 with the aid of a cup-shaped clamping ring 79 and a number of bolts 80. It will be noted that the aforementioned bolts 76 are entered through holes formed in the resilient ring 78 towards its radially innermost edge whilst the bolts 80 are entered through similar holes formed near the radially outermost edge of the ring 78.

The housing 77 is rotatably mounted on the uppermost end 82 of the shaft 83 by means of a pair of ball bearings 81 located internally of the sleeve 74. The housing 77 of the clutch 83 is the principal "driven" component of the clutch. Four shoes 85, 86, 87 and 88 are mounted alongside the concave inner wall 84 of the housing 77, each shoe being faced with friction material 89 of a kind suitable for forming conventional brake linings. The material 89 may, for example, be that denoted by the registered trademark "Ferodo." A ring 90 is welded to the shaft 17 at a level mid-way between the uppermost and lowermost extremities of the four shoes 85 to 88, said ring being formed at its periphery with four equi-angularly spaced recesses 91, 92, 93 and 94. Each one of the four recesses 91 to 94 accommodates a corresponding one of four coupling elements 95, 96, 97 and 98.

The positions of the four shoes 85 to 88 relative to one another are fixed within limits since, as can be seen in FIGURE 12, each shoe is formed at one end with a recess 99 which accommodates a tooth 100 carried by the neighbouring end of the adjoining shoe. Moreover, as can be seen in FIGURE 10 in respect of the shoe 85, the concave radially innermost side of each shoe is formed with a stop 101 which is located approximately mid-way along the length of that side. Said side has a curved portion 102 whose centre of curvature coincides with the longitudinal axis 103 of the shaft 17 located forwardly of the stop 101 relative to the intended direction of rotation 119 of the shaft 17 and a flat portion 104 located rearwardly of the stop 101 relative to said direction.

Each of the coupling elements 95 to 98 as is shown in detail in respect of the coupling element 95 has a trapezoidal profile, the parallel sides of said profile being denoted by the reference numerals 105 and 106 and the relatively inclined sides by the reference numerals 107 and 108. The side 105 is the shorter of the two parallel sides. It can be seen from FIGURES 9 to 11 that each of the coupling elements 95 to 98 has a central narrowed portion 110 (shown in section in FIGURES 10 and 11), said portion 110 being flanked on its non-parallel sides by grooves 111 and 112 in which the edges 112 and 113 of the recess 91 are entered. These edges 112 and 113 extend parallel to one another, a rectilinear extension of the edge 113 intersecting the axis 103 of the shaft 17 (see FIGURE 10).

The interior of the housing 77 is closed by a closure plate 114 that is retained in its appointed position with the air of bolts 115. The convex outer wall of the housing 77 is formed with three annular heat-dispersing fins 116. A tubular casing 117 concentrically surrounds the shaft 17 and has its uppermost end entered through a hole formed in the closure plate 114. The shaft 17 is journalled in the casing 117 with the aid of a ball or roller bearing 118 located at the level of the closure plate 114.

In the use of the spreading implement which has been described, the tractor 9 or other propelling vehicle tows it over the ground in the direction 11, the conveyor 13 being driven from the ground wheel 4 in such a way that its chains 40 and 41 move in the direction indicated by the arrow 58 in FIGURE 1. Accordingly, those runs of the two chains 40 and 41 that are disposed internally of the hopper 10 move along its floor 45 in a direction opposite to the direction 11. Artificial fertilizer, seed or other material to be spread that is contained in the hopper 10 is thus conveyed rearwardly towards the outlet port 12. The material passes outwardly through the opening 52 at a rate dependent upon the setting of the shutter plate 53 and falls on to the ejector or spreading member 16 which is being rotated by drive derived from the power take-off shaft of the tractor or other propelling vehicle 9. Since the conveyor chains 40 and 41 enter the hopper 10 through the mouth 46, no appreciable quantity of material can escape from the hopper 10 through said mouth.

When the various parts of the implement are arranged in the positions illustrated in the drawings, material leaving the outlet port 12 will fall on to the ejector 16 in a region thereof which is such that it will be centrifugally ejected therefrom so as to fall to the ground at the rear of the implement in substantially equal quantities on either side of the aforementioned plane 59. It will be apparent that the nature and consistency of the material which is being spread will affect its distribution spectrum with respect to the plane 59 assuming a substantially constant speed of rotation of the ejector 16. If, with any particular material, it is found that the material is falling in unequal quantities on opposite sides of the plane 59, then the position of the ejector 16 can be changed by withdrawing the locking pin 34 and turning the supporting structure 24 about the axis 38 of the shaft 28. The supporting structure 24 is retained in a new angular setting about the axis 38 by entering the pin 34 through the holes in the bracket 31 and through a newly chosen pair of holes 33. Since the position of the outlet port 12 relative to the frame 1 of the implement remains unchanged, material which passes therethrough will fall on to a different region of the ejector 16 than before the adjustment just mentioned was made. The distribution spectrum of the material is thus varied. In certain circumstances, it is desirable that the material should be spread wholly or mainly to one side of the plane 59 rather than substantially equally on opposite sides thereof as previously described. In such cases, the ejector 16 is moved with the aid of the supporting structure 24 to a position such that the material from the outlet port 12 will fall onto a region thereof which is appropriate for spreading the material to the desired side of the plane 59. As can be seen in FIGURE 3 of the drawings, the ejector 16 can be adjusted about the axis 38 through an arc 60 subtending an angle of about 15° at that axis. This is generally sufficient to enable a user of the implement to make adjustments which will attain all the different variations of the distribution spectrum of the material which he is likely to require. However, it will be apparent that, if required, the magnitude of the arc 60 could readily be made greater than 15°.

The relatively longitudinally offset arrangement of the two chains 40 and 41 has been found to have an advantageous effect upon the uniform delivery of the material to the outlet port 12. The shutter plate 53 turns inwardly of the hopper 10 to increase the effective cross-sectional area of the opening 52 and can be clamped in a setting which accurately determines the volume of material per unit time which is delivered from the hopper. It is important to be able to effect an accurate control of the rate of delivery of the material since the effective distribution of various kinds of material is very dependent upon this factor.

During the use of the implement, it is drawn over the ground in the direction 11 (FIGURE 1) by the tractor 9 or other propelling vehicle the power take-off of which is employed to rotate the shaft 17 in the direction 119 (FIGURE 10). The ring 90 will, of course, also turn in the direction 119 thus bringing the edge 113 of the recess 91 into contact with a point 120 of the coupling element 95 located at the junction between the side 106 of that element and the base of the groove 112. Since the centre of gravity 121 of the element 95 is located further from the axis 103 than is the point 120, the said element, which is being urged centrifugally outwardly by the rotation of the shaft 17, turns about the point 120 until its side 105 is in abutting contact with the flat portion 104 of the inner side of the shoe 85. The side 105 slides along the portion 104 until the flanking side 107 of the element 95 meets the stop 101. This causes the shoe 85 to be urged radially outwardly so that its facing of friction material 89 will be pressed firmly into contact with the inner wall 84 of the housing 77. The clutch is thus engaged so that the housing 77 and the ejector 16 which it carries are rotated in the direction 119. Obviously, the elements 96, 97 and 98 co-operate in an identical manner with the recesses 92, 93 and 94 and the shoes 86, 87 and 88.

The frictional engagement between the shoes 85 to 88 and the housing 77 is such that the clutch can slip if the inertia of the ejector 16 is too great to allow sufficient turning moment to be transmitted through the clutch for the ejector 16 to accelerate angularly at the same speed as the shaft 17. This is important since the inertia of the ejector 16 is deliberately increased by the provision of the ring 65. The weight of the ejector 16, which includes the weight of the disc 62 and the blades 64, is about 10 kilograms and, in this case, the weight of the ring 65 is preferably greater than twice the weight of the ejector, that is to say, greater than 20 kilograms. In the actual embodiment which is being described, the ring 65 weighs approximately 50 kilograms and the combined weight of the ejector 16 and ring 65 is about six times the weight of the ejector 16 alone.

When the ejector 16 has reached its maximum speed of rotation, the inertia of the ring 65 will exert a strong tendency to prevent rapid deceleration, or acceleration, of this speed. If, for example, the speed of rotation of the shaft 17 is rapidly reduced, the clutch 83 acts as a "freewheel" so that the housing 77 turns relative to the shaft 17 and ring 90 in the direction indicated by the arrow 119 in FIGURE 10. The portions 104 of the shoes 85 to 88 will thus push the coupling elements 95 to 99 inwardly into the recesses 91 to 94 (see FIGURES 10 and 11). The inner sides of the four shoes 85 to 88 will continue to slide along the sides 105 of the coupling elements 95 to 99 until the speed of rotation of the shaft 17 again becomes greater than that of the housing 77. When this happens, the clutch 83 will become re-engaged in the manner previously described.

The ejector 16 will normally commence to rotate in a substantially horizontal plane and, due to its substantial weight, a gyroscopic effect will be produced which will tend to resist tilting of said plane of rotation. It will be apparent from FIGURE 9 of the drawings that the only connections between the ejector 16 and the housing 77 are afforded by the ball 71 and the rubber or other resilient ring 78. The various parts are so constructed and arranged that the longitudinal axis of the stud 69 can be inclined to the longitudinal axis 103 of the shaft 17 at an angle of up to about 10°, the housing 77 serving as a stop for the clamping ring 79 so as to prevent greater angular deflections. If desired, the ball and socket joint of which the ball 71 forms a part may be provided with a stop arranged to serve the same purpose. If, during use of the implement, the shaft 17 temporarily becomes inclined to the vertical, the rapidly rotating ejector 16 will tend to maintain its approximately horizontal plane of rotation. It will be appreciated that the relatively thick rubber or other resilient ring 78 will resist this tendency since it normally acts to maintain the longitudinal axis of the stud 69 and the axis 103 in coincident relationship.

The tendency of the plane of rotation of the ejector 16 to remain substantially horizontal increases the efficiency of the implement in respect of the evenness of distribution of material since the ejector 16 is not affected to any appreciable extent as the ground wheels 3 and 4 of the implement travel over uneven ground. The evenness of the distribution is also dependent to a substantial extent upon a constant speed of rotation of the ejector 16 and this consistency of rotation is greatly improved by the provision of the overrunning or free-wheel clutch 83. The beneficial effect of the clutch 83 is particularly noticeable when, as in the present case, the ejector 16 is driven from the power take-off shaft of a propelling tractor such as the tractor 9. The speed of rotation of the power take-off shafts of tractors is subject to substantial fluctuations in dependence upon the condition of the land over which the implement is being towed.

What I claim is:

1. An implement for spreading material, said implement comprising a frame, a container and a rotary spreader, an outlet in said container and said spreader being positioned beneath said outlet, a support for said spreader pivotably connected to said frame, said support having two ends, one end of said support being pivotably connected to said frame about a substantially vertical axis, the other end of said support being releasably fixed to said frame whereby said spreader can be laterally swung about said axis to several positions.

2. The invention of claim 1 wherein a conveyor is mounted at the lower portion of said container to urge material towards the said outlet.

3. The invention of claim 2 wherein the frame is supported on ground-engaging wheels and the conveyor is driven by at least one of said wheels.

4. The invention of claim 2 wherein the conveyor is comprised of two adjacent concurrently driven link chains, the links of one chain being offset relative to the links of the other chain.

5. The invention of claim 2 wherein the container has an entrance at one end and an outlet at the opposite end and a single run of the conveyor runs along the bottom of the container through the entrance and outlet.

6. The invention of claim 5 wherein the entrance is formed of a longitudinal tubular member extending within the container.

7. The invention of claim 6 wherein the outlet is provided with a shutter pivotally adjustable to vary the effective cross-sectional area of the outlet and means are provided to clamp the shutter in chosen settings.

8. An implement for spreading material, said implement comprising a frame, a container and a rotary spreader, said container having an outlet for delivering material to said spreader, drive means for rotating said spreader, said spreader being mounted on a rotatable housing, said drive means comprising a drive shaft and overrunning clutch means operatively connecting said housing and said drive shaft whereby said clutch means disengages said spreader and said housing when the speed of rotation of said shaft is exceeded by the speed of rotation of said spreader.

9. The invention of claim 8 wherein the spreader is rotatable about a substantially vertical axis and has an inertia weight.

10. The invention of claim 9 wherein the spreader comprises a disc, said disc having spreader blades on its upper surface and an inertia weight about the disc's outer periphery on its lower surface.

11. The invention of claim 10 wherein the outer periphery of the spreader disc is located at a higher level than its center.

12. An implement for spreading material, said implement comprising a frame, a container and a rotary spreader, said container having an outlet for delivering material to said spreader, means for rotating said spreader, said means including a substantially vertical drive shaft, said spreader and said shaft being connected by joint means whereby said spreader can be inclined at different angles about said shaft during rotation.

13. The invention of claim 12 wherein the joint means is a universal ball and socket joint and a resilient element also interconnects the shaft and the spreader.

14. The invention of claim 13 wherein the resilient element is a rubber ring and stop means are provided to limit the angle of inclination of said spreader to the shaft.

15. The invention of claim 8 wherein the clutch includes at least one coupling element located between the driving portion thereof and the driven portion thereof to which latter the housing is connected, the coupling element being pivotable relative to the driving portion of the clutch whereby upon an increase in the speed of rotation of said driving portion, the element tends to move pivotally into a position in which the driving portion transmits rotary drive to the driven portion.

16. The invention of claim 15, wherein the coupling element is lodged in a recess of the driving portion, and wherein said element is four-sided in cross-section, the corner between two of said sides comprising the pivot point about which said element can turn during use of the implement.

17. The invention of claim 15 wherein the element co-operates with a friction shoe to urge said shoe into contact with the driven portion of the clutch upon an increase in the speed of rotation of the driving portion.

18. The invention of claim 17 wherein the friction shoe has a stop arranged to cooperate with the coupling element when the clutch is in engagement.

19. The invention of claim 18, wherein a surface of the stop is inclined to the facing side of the coupling element when the clutch is engaged.

20. The invention of claim 17, wherein the friction shoe has a flat portion and wherein a side of the coupling element abuts against said flat portion when the clutch is engaged.

21. The invention of claim 17, wherein four friction shoes are provided, said shoes being equiangularly distributed around the axis of rotation of the driving portion of the clutch.

22. The invention of claim 21, wherein each friction shoe is formed at one end with a recess and at the opposite end with a tooth, said shoes being arranged in a circle with the teeth and recesses in engagement with one another.

23. The invention of claim 15, wherein the coupling element is lodged in a recess and the recess is formed in a ring carried by the driving portion of the clutch, a narrowed portion of the coupling element being lodged in the recess whereby the coupling element is prevented from effecting any appreciable movements in directions perpendicular to the plane of the ring.

24. The invention of claim 23, wherein the ring is secured to a driving shaft of the clutch, and wherein a plurality of recesses are formed circumferentially around said ring.

25. The invention of claim 12 wherein the spreader has an inertia weight.

26. An implement for spreading material, said implement comprising a frame, a container and a rotary spreader, said container having an outlet for delivering material to said spreader, drive means for rotating said spreader, said drive means including speed regulating means for obtaining a constant speed of rotation of said spreader, said regulating means including a rotatable housing, said spreader being mounted on said housing, radially disposed means positioned to frictionally cooperate with said housing to affect the rate of rotation of said spreader, a substantially vertcial drive shaft within said housing for driving said spreader.

27. An implement of claim 26, wherein said drive shaft is connected to a support, said support being adjustably connected to the frame, fixing means associated with said support whereby said support can be laterally adjusted and fixed in several positions relative to said frame.

28. An implement of claim 1, wherein the spreader includes a shallow dished disc and spreading blades fastened to the upper surface of the disc, said blades each having two curved parts, a convex side of a first part being foremost and a convex side of a second part being rearmost relative to the direction of intended rotation of said spreader, said first part being located adjacent the axis of rotation.

References Cited by the Examiner

UNITED STATES PATENTS

| | | | |
|---|---|---|---|
| 1,164,579 | 12/1915 | Curtis | 275—8 |
| 1,880,155 | 9/1932 | Ruth | 275—8 |
| 1,944,069 | 12/1934 | Connors | 192—105 X |
| 2,255,505 | 9/1941 | Dunham. | |
| 2,430,020 | 11/1947 | Johnson | 275—8 |
| 2,517,151 | 8/1950 | Weston | 275—8 X |
| 2,538,886 | 1/1951 | Skibbe et al. | 275—8 |
| 3,019,025 | 1/1962 | Young | 275—8 |
| 3,143,005 | 8/1964 | Schwerdhofer | 192—105 X |

FOREIGN PATENTS

| | | |
|---|---|---|
| 869,440 | 3/1953 | Germany. |
| 114,786 | 9/1945 | Sweden. |

ABRAHAM G. STONE, *Primary Examiner.*

J. R. OAKS, *Assistant Examiner.*